US005512343A

United States Patent [19]

Shaw

[11] Patent Number: 5,512,343

[45] Date of Patent: Apr. 30, 1996

[54] LABEL ASSEMBLY

[75] Inventor: John T. Shaw, Fenton, Mo.

[73] Assignee: Diagraph Corporation, St. Peters, Mo.

[21] Appl. No.: 284,093

[22] Filed: Aug. 1, 1994

[51] Int. Cl.[6] .......... B32B 3/10

[52] U.S. Cl. .......... 428/40; 283/81; 428/41; 428/42; 428/43; 428/131; 428/904.4; 428/906

[58] Field of Search .......... 428/40, 41, 42, 428/43, 131, 904.4, 906; 283/81

[56] References Cited

U.S. PATENT DOCUMENTS

| | | | |
|---|---|---|---|
| 1,965,289 | 7/1934 | Humphner | 428/42 |
| 2,278,673 | 4/1942 | Savada | 428/42 |
| 3,885,070 | 5/1975 | Chapman | 428/42 |
| 3,914,483 | 10/1975 | Stipek, Jr. | 428/42 |
| 4,032,679 | 6/1977 | Aoyagi | 428/42 |
| 4,055,249 | 10/1977 | Kojima | 206/447 |
| 4,060,168 | 11/1977 | Romagnoli | 206/216 |
| 4,188,250 | 2/1980 | Grass | 156/253 |
| 4,317,852 | 3/1982 | Ogden | 428/40 |
| 4,394,904 | 7/1983 | Larimore | 206/447 |
| 4,584,219 | 4/1986 | Baartmans | 428/42 |
| 4,952,433 | 8/1990 | Tezuka | 428/42 |
| 5,139,836 | 8/1992 | Burke | 428/42 |
| 5,219,183 | 6/1993 | McKillip | 283/62 |

*Primary Examiner*—Nasser Ahmad

*Attorney, Agent, or Firm*—Senniger, Powers, Leavitt & Roedel

[57] ABSTRACT

A label assembly comprising a carrier of flexible sheet material, and a series of labels on the carrier. Each label has a first major region for adhesive securement to a label-receiving surface, and a second major region adjacent to the first major region. Adhesive on the rear face of each label covers substantially the entire rear face of the label, including the first and second major regions. Die cuts in the carrier form a plurality of separate but closely spaced cover pieces substantially covering the rear face of one of the first and second major regions of each label. These cover pieces remain on the label when the label is peeled off the carrier, so that the rear face of the one region is rendered substantially non-adhering by the cover pieces and the rear face of the other region is adapted for adhesive securement to the label-receiving surface.

20 Claims, 2 Drawing Sheets

1
3
5
7
9
11
17
19A
19B
21
23
25
27
29
33
3
3

LABEL ASSEMBLY

BACKGROUND OF THE INVENTION

The present invention relates generally to labels and, more particularly, to an assembly of labels (e.g., a roll or sheet of labels) suitable for applications where a portion of each label must be adhering and a portion substantially non-adhering after the label has been peeled off its carrier.

The labels of this invention are especially (although not exclusively) suited for use on freezer shelves of the type commonly found in grocery stores and supermarkets. Labels of this type typically carry pricing, inventory, promotional and other information. Labels of conventional design are provided in roll or sheet form, the labels being peelable off the carrier (either a web or sheet) and then adhered to shelving. The labels are often of such a size that they hang down from the shelves to which they are affixed. This can create a problem, since dirt and other matter tends to stick to the exposed adhesive on the back side of the hang-down part of the label. Also, the hang-down part of the label tends to stick to adjacent surfaces, including items stocked on lower shelving.

There have been attempts to overcome this problem. In one such attempt, labels are carried by a continuous web of sheet material, and the web is die cut so that a large rectangular part of the web remains affixed to the lower portion of the label when the label is peeled off the web. The cut portion of the web covers the hanging portion of the label and renders it mostly non-adhering. While this addresses the adherence problem mentioned above, cutting the web in this manner significantly reduces the tensile strength of the web in the direction of its length. As a result, the web tends to break and tear as it is pulled through the printing and die-cutting machinery necessary to make the labels. This causes expensive production downtime. Also, since the web material is usually water-absorbent, the presence of the cut piece of web on the hang-down part of the label tends to cause the label to curl while it is on the shelf, particularly in a freezer environment, which makes the information on the label difficult to read.

There is a need, therefore, for a label construction which solves the aforementioned problems, and which can readily be manufactured.

SUMMARY OF THE INVENTION

Among the several objects of this invention may be noted the provision of an improved label assembly which allows a series of labels to be peeled quickly and easily off a carrier web or sheet for easy application of the labels; the provision of such a label assembly wherein the labels of the assembly are particularly suited for use as shelf labels (e.g., freezer shelf labels); the provision of such an assembly in which the hang-down portion of each label is rendered substantially non-adhering when the label is peeled off the carrier so that the hang-down portion will not stick to adjacent items or surfaces and so that particles of dirt and the like will not stick to the label; the provision of such a label assembly which can be provided in either roll or sheet form; the provision of such a label assembly which, in roll form, has a tensile strength sufficient to avoid undue breakage of the web material during the manufacturing process, resulting in less production downtime; the provision of such a label assembly wherein the labels of the assembly are not prone to significant curling when applied to shelving in a freezer environment; the provision of such a label assembly which, in roll form, minimizes the amount of scrap which must be disposed of after the labels have been removed, and which provides for the convenient handling of such scrap as a single continuous piece of scrap; the provision of such a label assembly which can be made from a wide range of label materials for greater flexibility; the provision of such a label assembly which can utilize materials capable of being printed using a variety of printing techniques, including thermal transfer and direct thermal processes; and the provision of such a label assembly which is inexpensive to manufacture.

In general, a label assembly of this invention comprises a carrier of flexible sheet material, and a series of labels on the carrier. Each label has a first major region adapted for adhesive securement to a label-receiving surface, a second major region adjacent to but not surrounded by the first major region, a front face facing away from the carrier adapted to receive print, and a rear face facing toward the carrier. Adhesive on the rear face of each label covers substantially the entire rear face of the label, including said first and second major regions. The adhesive holds the label on the carrier and is adapted to remain on the rear face of the label when the label is peeled off the carrier. Die cuts in the carrier form a plurality of separate but closely spaced cover pieces substantially covering the rear face of one of said first and second major regions of each label. The cover pieces remain on the label when it is peeled off the carrier so that the rear face of said one region of the label is rendered substantially non-adhering by said cover pieces and the rear face of the other of said regions is adapted for adhesive securement to said label-receiving surface.

In a second aspect of this invention, the label assembly comprises a continuous web in roll form, the web having opposite side edges extending longitudinally of the web. A series of labels are positioned on the web at closely spaced intervals along the web. Each label has a front face adapted for receiving print and a rear face releasably adhered to the web so that the label can be peeled off the web and applied to a label-receiving surface. Die cuts in the web define, for each label, a plurality of cover pieces cut from the web adapted to separate from the web and to remain on the rear face of the label when the label is peeled off the web. The cover pieces are sized to cover a major region of the label, and they are spaced sufficiently close to render the label substantially non-adhering over said major region of the label when the label is peeled off the web but sufficiently far apart to provide interconnected areas of web to which the rear face of the label can adhere before the label is peeled off the web thereby to increase the tensile strength of the label assembly in a direction extending longitudinally of the web.

In a third aspect of this invention, a supply of shelf labels comprises a carrier of flexible sheet material, and a series of closely-spaced labels adhered to the carrier. Each label has a front face adapted for receiving print and a rear face releasably adhered to the carrier so that the label can be peeled off the carrier and then applied to a shelf, an upper major region adapted to be applied to said shelf and a lower major region adapted to hang down from the shelf when the label is adhered to the shelf. Die cuts in the carrier define, for each label, a plurality of cover pieces cut from the carrier adapted to separate from the carrier and to remain on the rear face of the label when the label is peeled off the carrier. The cover pieces are sized and located to cover the lower major region of the label and sufficiently closely spaced to render the lower major region substantially non-adhering.

Other objects and features of this invention will be in part apparent and in part pointed out hereinafter.

BRIEF DESCRIPTION OF THE DRAWINGS

Corresponding parts are designated by corresponding reference numerals in the several views of the drawings.

DETAILED DESCRIPTION OF THE PREFERRED EMBODIMENT

Figures 1, 2, 3:
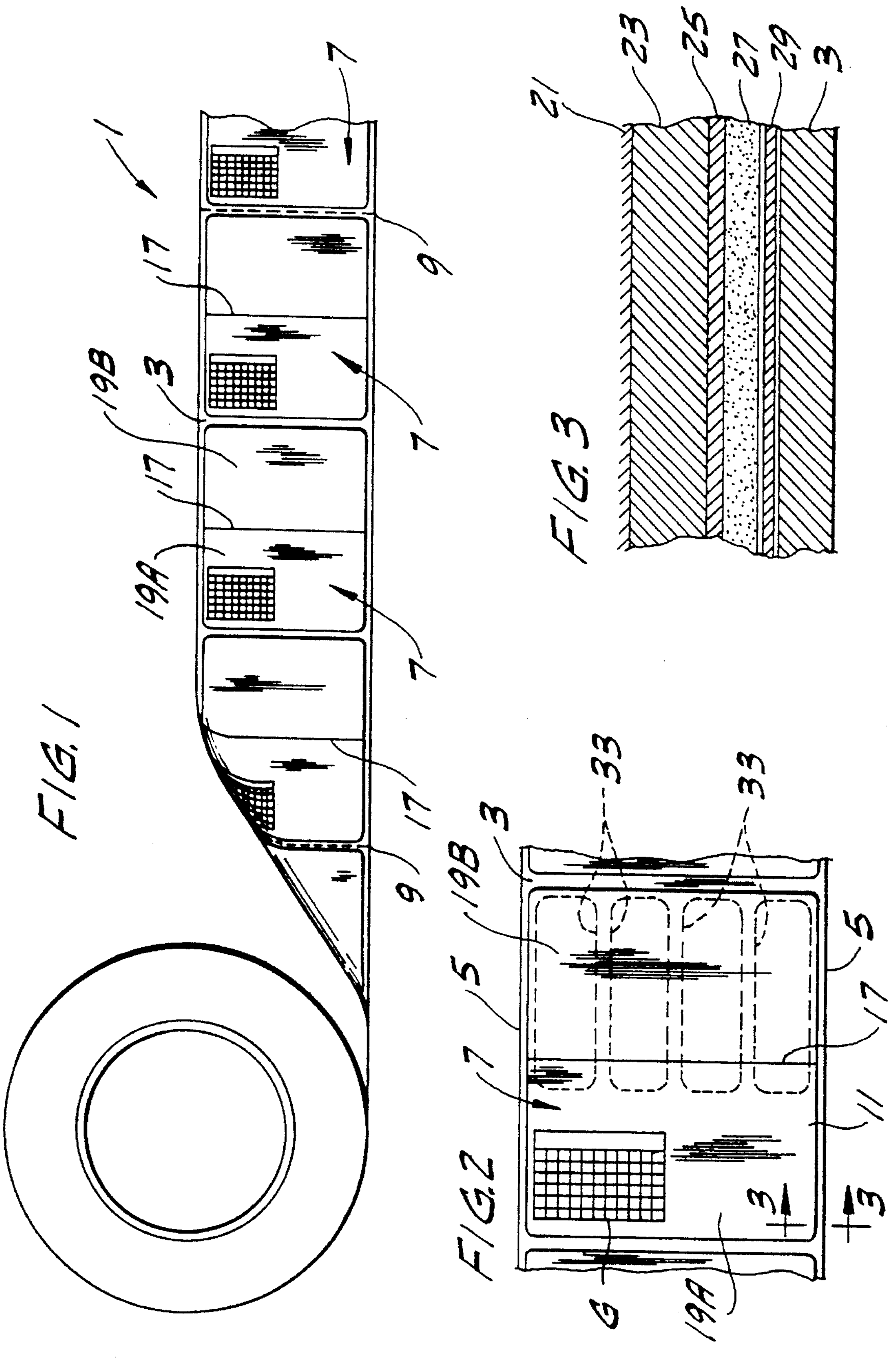
FIG. 1 is an elevational view showing a roll of labels of the present invention.
FIG. 2 is an enlarged portion of FIG. 1 showing the label assembly of this invention as viewed from the front of the label.
FIG. 3 is an enlarged section on line 3—3 of FIG. 2.

Referring now to the drawings, and first more particularly to FIGS. 1 and 2, a label assembly of the present invention in roll form is designated in its entirety by the number 1. Generally speaking, the assembly comprises a carrier constituted by a continuous web 3 of flexible material having opposite side edges 5 extending longitudinally of the web, and a series of labels, each generally 7, adhered to the web at regular intervals along the web. The web 3 may be perforated along lines 9 which extend transversely of the web at intervals corresponding to every two or three labels 7 so that a desired length of web carrying a desired number of labels can readily be separated from the roll.

Figure 5:
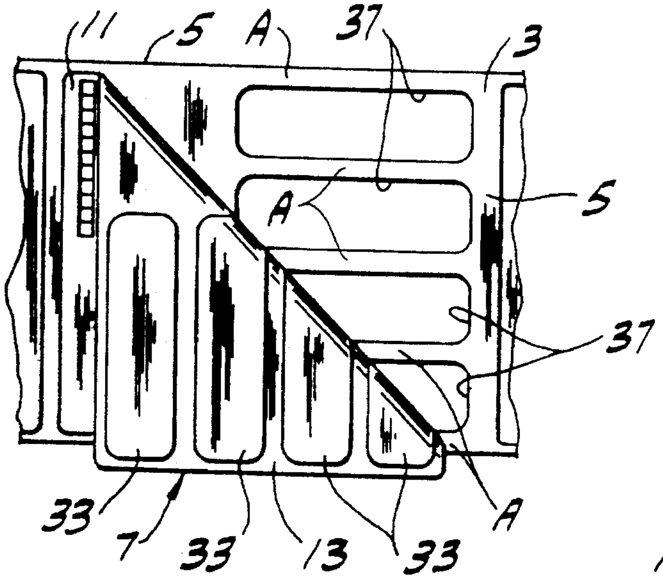
FIG. 5 is a view showing a label being peeled away from its carrier.
Figure 6:
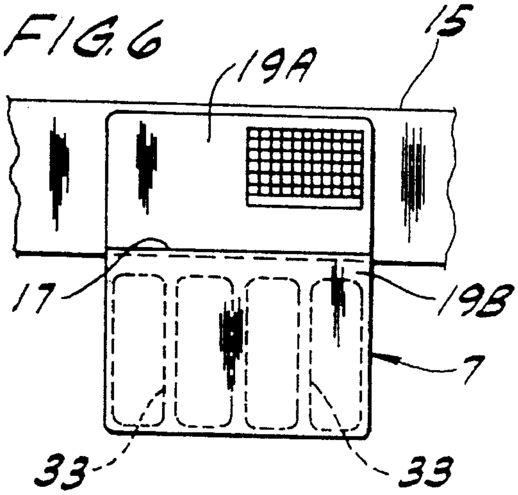
FIG. 6 is a front elevation of a label applied to a shelf.
Figure 7:
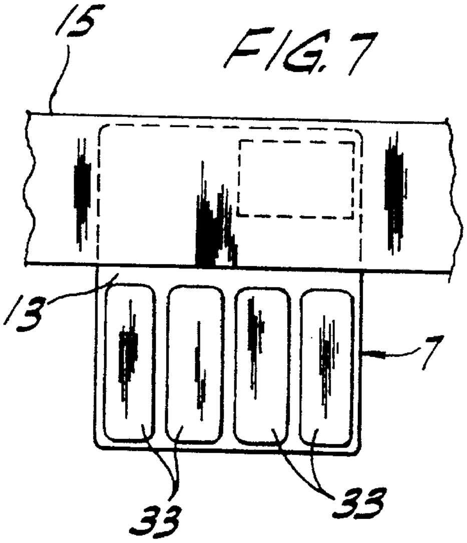
FIG. 7 is a rear elevation of the label of FIG. 6.

Each label 7 has a front face 11 (FIG. 2) adapted for receiving print, and a rear face 13 (FIG. 5) releasably adhered to the web 3 so that the label can be peeled off the web and then applied to a label-receiving surface such as a freezer shelf 15 (FIGS. 6 and 7). A line of print 17 extending transversely across the front face of the label divides the label into first and second major regions designated 19A and 19B, respectively, the first region 19A being the upper region and the second region 19B being the lower region when the label is used as a shelf label and applied to a shelf 15 as shown in FIGS. 6 and 7. The first (upper) region 19A typically has printed information thereon which may include, for example, customer pricing information on a grid G, and bar code information of the standard type. The second (lower) region 19B of the label, sometimes referred to as the "talking" portion of the label, may display advertising or customer information of some sort.

As shown best in FIG. 3, the label assembly comprises a number of layers, including a top coating 21, a layer of label stock material 23 (e.g., a 2-mil polyolefin film), a primer 25, an adhesive 27, a release coating 29 and the web 3. The top coating 21 (e.g., a polymer resin) improves or changes the surface properties of the label stock material by making it more ink receptive and/or absorbent, for example. The primer 25 increases the opacity of the label 7, improves anchorage of the adhesive 27 to the label to keep the adhesive on the label when it is removed from the web 3 (and when it may later be peeled off a label-receiving surface), and seals the label material against penetration of adhesive into the label material. The adhesive 27 is typically a commercially available pressure sensitive adhesive (e.g., an acrylic based adhesive). The release coating 29 is a coating (usually silicone based) that is applied to the top side of the release liner 31 to prevent the adhesive from adhering to the web. The web 3 receives the release coating 29, provides protection for the adhesive 27 and supports the label material during the die cutting and printing operations. It may be of a relatively thin kraft paper stock, for example. The materials used for these layers will vary from application to application and in accordance with the type of printing process used, and it will be understood that a wide range of materials may be used without departing from the scope of this invention.

Figure 4:
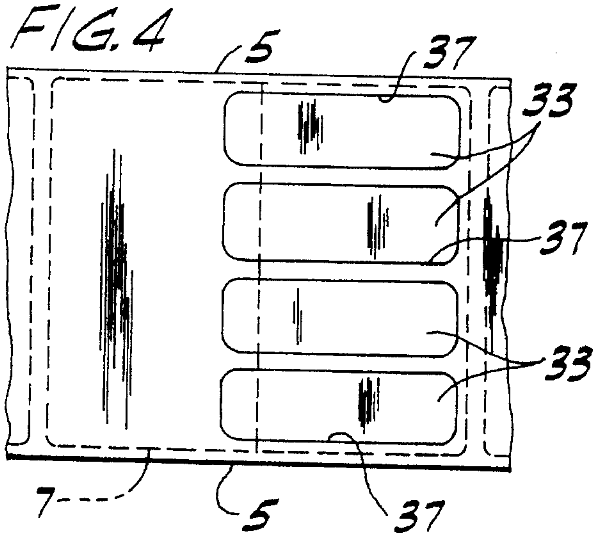
FIG. 4 is a rear elevation of the label assembly of FIG. 2.

In accordance with the present invention, the web 3 is die cut to form a plurality of separate but closely spaced cover pieces (e.g., at least three pieces), each designated 33, which are sized and located to substantially cover the rear face 13 of the second (lower) region 19 of each label 7. These cover pieces 33, shown in dashed lines in FIG. 2 and solid lines in FIG. 4, are generally rectangular in shape and preferably extend generally lengthwise of the web 3. The die cuts 37 in the web 3 extend completely through the web but not through the label stock material, so that when a label 7 is peeled off the web, the cover pieces 33 remain on the rear face 13 of the label and render the second (lower) region 19B of the label substantially non-adhering (FIG. 5). Thus, when the first (upper) region 19A of the label is adhered to a shelf 15 or other label-receiving surface in a position in which the second (lower) region 19B of the label 7 hangs down from the shelf, dirt and other matter will not adhere to the back of the hang-down part of the label, and this part of the label will not stick to adjacent items on nearby surfaces.

It will be understood that the cover pieces 33 may be of virtually any size and shape (e.g., rectangular, circular, star-shaped) so long as they render the back of the second region 19B of the label 7 substantially non-adhering. To achieve this, the pieces must be relatively closely spaced. However, it is also important that the cover pieces 33 be spaced sufficiently far apart (e.g., ⅛ in.) to provide interconnected uncut areas A of web 3 to which the rear face 13 of the label 7 can adhere before the label is peeled off the web. This design functions to increase the tensile strength of the web of composite label material in a direction extending longitudinally of the web, compared to the prior design discussed above in which the web is cut to form a single, relatively large cover piece which covers substantially the entire rear face of the lower region of the web. In this prior design, the die cuts in the web around the single cover piece significantly reduce the tensile strength of the composite web to the point where the web often breaks as it is pulled through the machines performing the die cutting and printing operations. By providing a greater web surface area to which the rear face 13 of the second region 19B of the label 7 can adhere, the overall tensile strength of the composite web is increased significantly. The adherence of the label material to the interconnected uncut areas A of the web between the cover pieces 33 reinforces the tensile strength of the web 3, which is typically of a material (e.g., kraft paper) having a relatively weak tensile strength and which is thus prone to break in the absence of such reinforcement.

Preferably, the cover pieces 33 (e.g., strips) extend generally parallel to the side edges 5 of the web 3, since it has been found that this minimizes curling of the hang-down lower region 19B of the label. It will be noted in this regard that the web is typically of an absorbent material, such as kraft paper. Thus, when the label is placed in a humid environment the cover pieces will absorb moisture. This tends to cause the cover pieces 33 (and thus the label 7) to curl, particularly in a freezer environment. Such curling can be minimized by orienting the strips 33 so that they extend generally vertically when the label is applied to the shelf (i.e., generally parallel to the "grain" of the fiber of the web stock), as shown in FIGS. 6 and 7.

The spacing between adjacent labels 7 on the web 3 may vary, but a typical spacing is approximately ⅛ in. As shown in the drawings, the width of each label in a direction extending transverse to the web 3 is slightly less than the width of the web, although this is not critical to the present invention.

The label assembly 1 depicted in the drawings is one where the carrier is a continuous strip (i.e., web 3). This arrangement provides for convenient manufacture and printing of the labels 7, is easy to handle and to use in the removal of labels from the web 3, and provides for the efficient disposal of waste since the scrap remaining after the labels have been peeled off the web is a continuous single piece of scrap. Alternatively, the carrier may be in sheet form (e.g., an 8-½ in.×11 in. sheet) or in fan-folded strip form. Also, the material used for the label assembly may be suitable for various types of printing, including thermal transfer printing, laser printing, direct thermal printing, ink jet printing, and dot matrix impact printing.

While labels of a label assembly of this invention are particularly suited for use as freezer labels, it will be understood that they may be used in other environments and have other applications (e.g., as signage).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A label assembly comprising a carrier of flexible sheet material, a series of labels on said carrier, each label having a first major region adapted for adhesive securement to a label-receiving surface, a second major region adjoining said first major region but not surrounded by said first major region, a front face facing away from said carrier adapted to receive print, and a rear face facing toward said carrier, adhesive on the rear face of each label covering substantially the entire rear face of the label, including said first and second major regions, said adhesive holding the label on the carrier and being adapted to remain on the rear face of the label when the label is peeled off the carrier, and die cuts in the carrier forming a plurality of separate cover pieces substantially covering the rear face of said second major region of each label, said cover pieces being adapted to remain on the label when the label is peeled off the carrier so that the rear face of said second major region is rendered substantially non-adhering by said cover pieces and the rear face of said first major region is adapted for adhesive securement to said label-receiving surface, said cover pieces being spaced apart to provide interconnected areas of said carrier to which the rear face of the label can adhere before the label is peeled off the carrier thereby to increase the tensile strength of the label assembly.

2. A label assembly as set forth in claim 1 wherein each of said labels is a shelf label, and wherein said first major region of each label is an upper end region of the label adapted to be adhesively applied to a shelf and said second major region is a lower end region of the label adapted to hang down from the shelf.

3. A label assembly as set forth in claim 2 wherein there are at least three cover pieces substantially covering the rear face of said lower end region of each label.

4. A label assembly as set forth in claim 3 wherein said cover pieces are elongate strips adapted to extend generally vertically with respect to each label as it is adhered to a shelf.

5. A label assembly as set forth in claim 1 wherein there are at least three cover pieces substantially covering the rear face of said second major region of each label.

6. A label assembly as set forth in claim 5 wherein said carrier is a continuous web of sheet material having opposite side edges extending longitudinally of the web.

7. A label assembly as set forth in claim 6 wherein each cover piece is elongate and extends in a direction generally parallel to said opposite side edges of the web.

8. A label assembly as set forth in claim 7 wherein each of said labels is a shelf label, and wherein said first major region of each label is an upper end region of the label adapted to be adhesively applied to a shelf and said second major region is a lower end region of the label adapted to hang down from the shelf.

9. A label assembly as set forth in claim 8 wherein said cover pieces of each label extend generally vertically when the label is adhered to a shelf.

10. A label assembly comprising a continuous web in roll form, said web having opposite side edges extending longitudinally of the web, a series of longitudinally spaced labels on the web, each label having a front face adapted for receiving print and a rear face releasable adhered to the web with adhesive covering substantially the entire rear face so that the label can be peeled off the web and applied to a label-receiving surface, die cuts in the web defining, for each label, a plurality of cover pieces cut from the web adapted to separate from the web and to remain on the rear face of the label when the label is peeled off the web, said cover pieces being sized to cover a major region of the label, and the cover pieces of each label substantially covering the rear face of the label to render it substantially non-adhering over said major region of the label when the label is peeled off the web, and said cover pieces being spaced apart to provide interconnected areas of web to which the rear face of the label can adhere before the label is peeled off the web thereby to increase the tensile strength of the label assembly in a direction extending longitudinally of the web.

11. A label assembly as set forth in claim 10 wherein there are at least three cover pieces substantially covering said major region of each label.

12. A label assembly as set forth in claim 11 wherein each cover piece is elongate and extends in a direction generally parallel to said opposite side edges of the web.

13. A label assembly as set forth in claim 12 wherein each label is a shelf label having an upper end region adapted to be adhesively applied to a shelf and a lower end region formed by said major region adapted to hang down from the shelf.

14. A label assembly as set forth in claim 12 wherein said cover pieces of each label extend generally vertically when the label is adhered to a shelf.

15. A supply of freezer shelf labels comprising a carrier of flexible sheet material, a series of longitudinally spaced labels adhered to the carrier, each label having a front face adapted for receiving print and a rear face releasable adhered to the carrier, with adhesive covering substantially the entire rear face so that the label can be peeled off the carrier and then applied to a freezer shelf, an upper major region adapted to be applied to said shelf and a lower major region adapted to hang down from the freezer shelf when the label is adhered to the freezer shelf, die cuts in the carrier defining, for each label, a plurality of cover pieces cut from the carrier adapted to separate from the carrier and to remain on the rear face of the label when the label is peeled off the carrier, said cover pieces being sized and located to cover said lower major region of the label and being separate from one another to reduce curling of the label in a freezer environment.

16. A supply of shelf labels as set forth in claim 15 wherein there are at least three cover pieces substantially covering said lower major region of each label.

17. A supply of shelf labels as set forth in claim 16 wherein said carrier comprises a continuous web having opposite side edges extending longitudinally of the web, and wherein each cover piece is elongate and extends in a direction generally parallel to said opposite side edges of the web.

18. A supply of shelf labels as set forth in claim 17 wherein said labels are positioned along the web to have a spacing of approximately ⅛ in. between adjacent labels.

19. A supply of shelf labels as set forth in claim 17 wherein each label has a width less than the width of said web.

20. A supply of shelf labels as set forth in claim 15 wherein said cover pieces are spaced apart to provide interconnected areas of carrier sheet material to which the rear face of the label can adhere before the label is peeled off the strip, and wherein said cover pieces extend vertically when the label is applied to a freezer shelf.

* * * * *